United States Patent [19]
Procop et al.

[11] 3,825,331
[45] July 23, 1974

[54] PROJECTION LAMP CARRIER

[75] Inventors: Alex J. Procop; Ace Boultinghouse, both of Northridge, Calif.

[73] Assignee: Target Systems Corporation, Chatsworth, Calif.

[22] Filed: July 19, 1973

[21] Appl. No.: 380,879

[52] U.S. Cl................................. 352/198, 240/37.1
[51] Int. Cl............................................. G03b 21/00
[58] Field of Search.............. 352/198; 240/37, 37.1

[56] References Cited
UNITED STATES PATENTS

| | | | |
|---|---|---|---|
| 3,228,286 | 1/1966 | Jarvis | 352/198 |
| 3,269,795 | 8/1966 | Floden | 352/198 |

*Primary Examiner*—Monroe H. Hayes
*Attorney, Agent, or Firm*—Wood, Herron & Evans

[57] ABSTRACT

A removable projection lamp carrier operably positions a primary projection lamp as a source of light for a projector's projection path and stores a spare lamp in a compact inoperable position. The carrier is provided with an electrical socket for mounting the primary lamp, and with releasable connectors for providing current to the socket and the primary lamp from cooperating connectors in the projector when the carrier is in its operable position. The carrier has a non-electric socket for receiving a spare projection lamp in an inoperable position as a spare or replacement for the primary lamp. All electrical connections to the carrier are broken when it is removed from the projector for lamp replacement.

8 Claims, 5 Drawing Figures

PATENTED JUL 23 1974 3,825,331
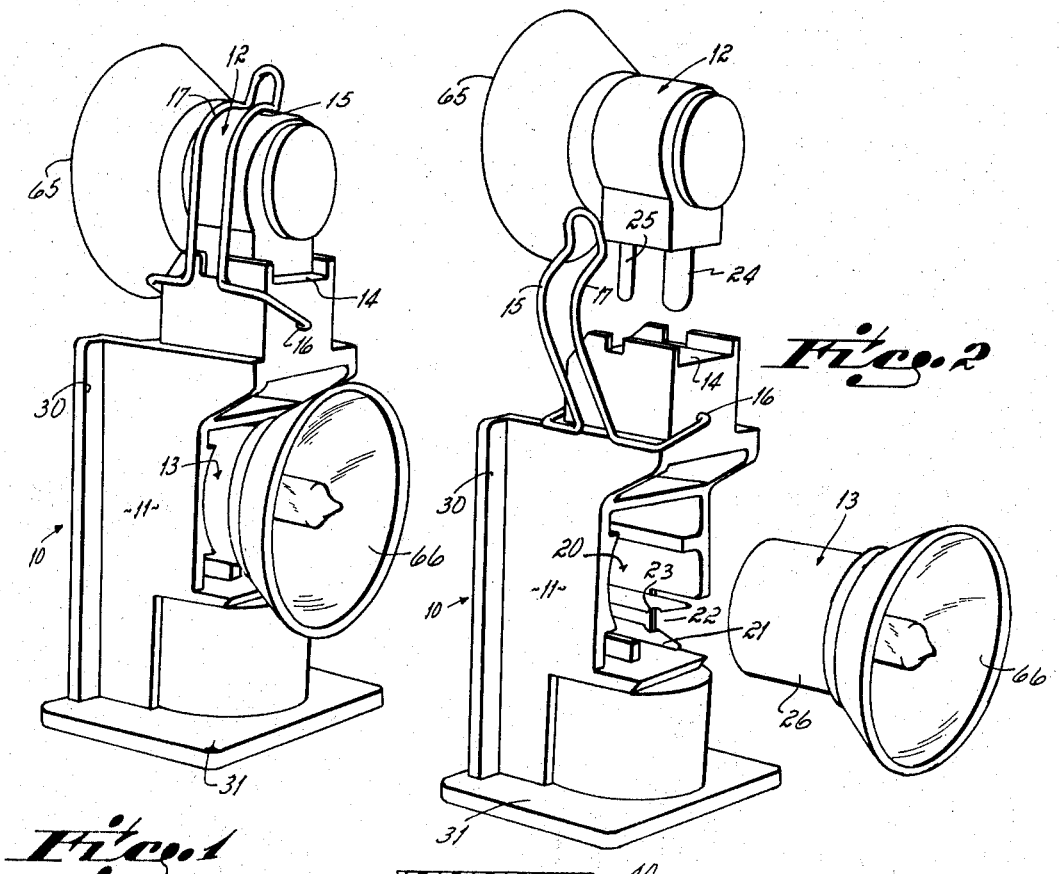
Fig. 2
Fig. 1
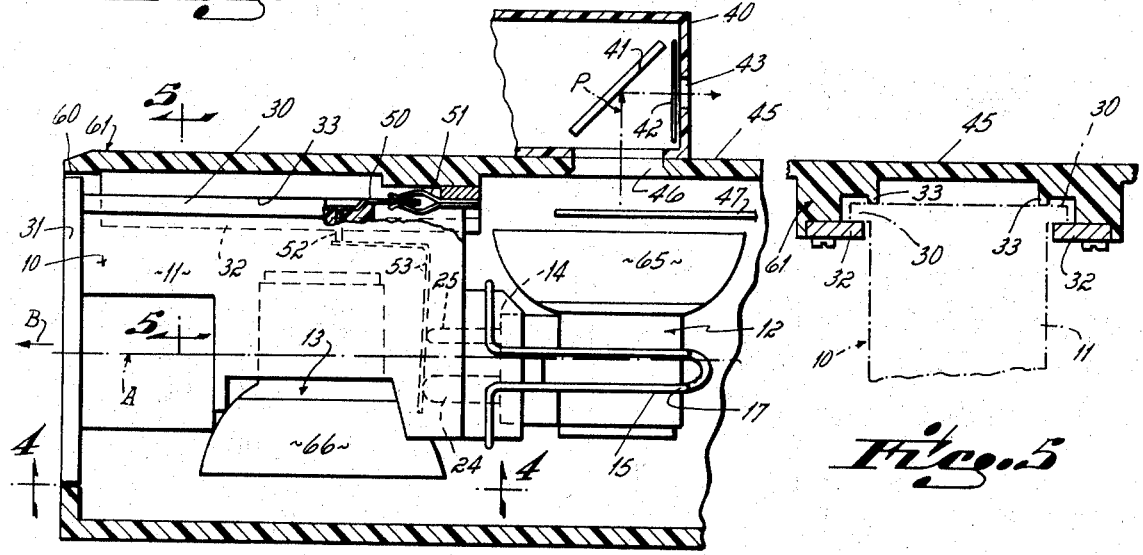
Fig. 3
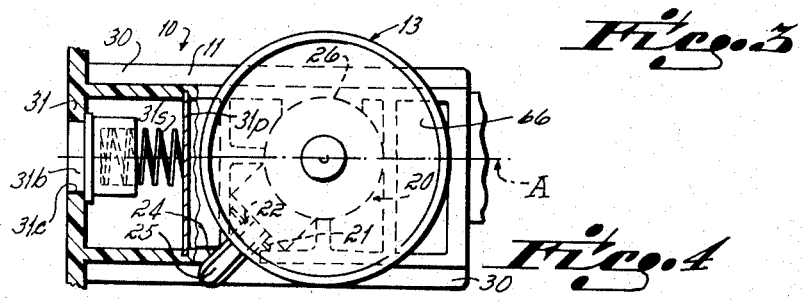
Fig. 4

PROJECTION LAMP CARRIER

This invention relates to projectors and particularly to a removable projection lamp carrier operably mounting a projection lamp within a projector and supporting a spare projection lamp in a stored position.

One of the most troublesome and frustrating factors in operating a film projector is the projection lamp burn-out. Such burn-outs normally occur during the use of a projector and, unless a spare lamp is at hand, the projector and the projection operation must be shut down. Additionally, the types of projection lamps vary from projector to projector and a particular type of lamp may be difficult to find without resorting to a specialized commercial outlet.

A related difficulty is that even should a spare lamp be available, projector design often renders replacement very difficult. When the projector is being operated for home use or for commercial demonstration purposes, for example, an unskilled operator frequently finds lamp replacement to be a complex if not impossible task. Certain tools may be required in order to disassemble and then reassemble the necessary parts.

A number of attempts have been made to solve the lamp burn-out problem by providing apparatus having a spare lamp mounted within the projector and movable into operative position upon primary lamp burn-out. U.S. Pat. Nos. 2,967,457; 3,228,286; 3,523,724; and abandoned application Ser. No. 648,586, filed Mar. 26, 1957 (and referred to in the above U.S. Pat. No. 2,967,457), disclose a few such attempts.

Movement and energization of the spare lamps of these disclosures is effected in different ways. In U.S. Pat. Nos. 2,967,457 and 3,523,724 and in the abandoned application Ser. No. 648,586, the spare lamp is mounted within an electrical socket secured to a sliding member. The sliding member is operable to remove the burned-out primary lamp from the optical path and to locate the spare lamp in the proper position. Thus, the sliding member moves between two operating positions. A switch is connected to energize the proper socket. In U.S. Pat. No. 3,228,286 two lamps are held on a rotatable disc which in one angular position operably locates a primary lamp in an optical path, and in another angular position operably locates a spare lamp in the optical path.

While such devices provide apparatus for changing lamps, there is still room for a great deal of improvement. Where a projector is a portable unit, and especially in the situation where it is to be used for commercial display, compactness is extremely important. The compactness of the projector is normally determined by the size and situation or location of its internal components including the projection lamp, or lamps, where a spare is included. Another consideration is the space required for the shifting or movement of the internal components.

While in recent years the size of the actual projection lamp has been decreased, it has become desirable to provide lamp units including a reflector of a relatively large size surrounding the lamp. Such a lamp is illustrated in U.S. Pat. No. 3,523,724. When two of these lamps are positioned together, as shown in this patent, the size of their reflectors and their projecting plug members together with the requirement that each lamp position must be movable into the optical path of the projector, requires that they be spaced some distance apart. Additionally, space must be provided for the sliding member mounting the lamps to be shifted between its two operating positions. In this patent, space must be provided for the shifting of the slidable member through a distance at least equal to the distance between the two lamps. Although such positioning and shifting may be suitable for such a permanent installation as in the patent, it would require more space than necessary in a portable projector.

Furthermore, the opening of the chamber enclosing the lamps to replace a lamp, or the movement of the lamp supporting element to a second position for properly locating the lamp is, in some prior projectors, somewhat dangerous, due to the fact that lamp sockets or connections are bared and there is a possibility of electrical shock therefrom. Also, the expense involved in providing additional electrical sockets, switches and wiring to energize the secondary bulb upon primary lamp burn-out and removal is another disadvantage to prior art systems.

It has thus been a primary object of the invention to provide a simple, economical, and easily removable lamp carrier for a projector, wherein the carrier supports and locates one projection lamp in a single operative position to provide a source of light for a projection path and stores another fresh projection lamp in an inoperative mount but in a very compact position with respect to the operating lamp.

A further object of the invention is to provide a lamp carrier movable between a first operable position within a projector to locate a primary projection lamp in an optical path of the projector while at the same time compactly storing an inoperable lamp, and a second withdrawn position where the stored lamp can be detached and then placed in the primary lamp position upon burn-out of the primary lamp and thereafter located in the optical path via the return of the carrier to its first position.

A yet further object of the invention is to provide a projector lamp carrier for operably supporting a primary lamp in an optical path of the projector when in a first position and being completely removable for replacement of the primary lamp, all electrical connections to the carrier being broken when it is removed.

In a preferred embodiment, the invention includes a simple removable projection lmap carrier with an electrical socket for mounting a first lamp in a single operable position and a storage cavity for maintaining a second lamp in a compact and inoperative stored position. The carrier can be easily pushed into its operable position or pulled from the projector in a drawer-like manner where the first lamp can be replaced with the second. Releasable electrical connectors are provided on the lamp carrier and cooperate with corresponding connectors on the projector to connect electricity to the electric socket and the operable lamp when the carrier is properly positioned within the projector. When the carrier is withdrawn, the connection is broken. A resilient clamp is provided to pivot over and engage the operable lamp to hold it in the socket. The spare lamp is held in its storage cavity by a releasable clip cooperating with the lamp's connectors.

In use, a carrier having two lamps properly inserted therein is pushed into the projector. The operable lamp is positioned by correct carrier insertion to direct light along the desired optical projection path in the projector. The unused lamp remains in its stored position until such time as the operating lamp burns out. The carrier is then pulled from the projector, the burned-out lamp removed, and the spare lamp is taken from its cavity and plugged into the electrical carrier socket. The retaining clamp is pivoted over the fresh lamp and the carrier is pushed back into the projector to provide a fresh lamp for continued projection.

Thus, a burned-out lamp is easily and quickly replaced with a compactly stored spare and with a minimum interruption time. No space is required within the projector for the shifting of the carrier between two operable positions. In addition, the carrier is electrically disconnected from the projector when it is removed and during handling of the lamps. The possibility of electrical shock to the operator is thereby greatly reduced. Further, the invention provides unique spare lamp storage without the expense of secondary electrical sockets, circuit switches, wiring, and the like.

These and other objects and advantages will become readily apparent from the following detailed description and drawings in which:

FIG. 1 is a view showing a lamp carrier and two lamps in secured positions;

FIG. 2 is an exploded view showing a lamp carrier with the lamps removed;

FIG. 3 is a cross-sectional view through a projector showing a lamp carrier supporting a lamp in operative position;

FIG. 4 is a sectional view taken along lines 4—4 of FIG. 3 and showing the orientation of the spare lamp in the lamp carrier; and FIG. 5 is a cross-sectional view taken along lines 5—5 of FIG. 3.

Now referring specifically to the drawings, there is shown at 10 in FIG. 1 a lamp carrier comprising a preferred embodiment of the invention. The lamp carrier unit includes a longitudinal carrier body 11, a first or primary projection lamp 12 located at a forward end of the carrier, and a second projection lamp 13, located in an intermediate portion of the carrier between the forward end and a rearward end. Primary projection lamp 12 is seated within an electrical socket 14 located at the forward end of the lamp carrier body 11. The lamp is held within the socket by way of a resilient clamp or latch 15. The end of the clamp is pivoted, as at 16, to the housing body and includes a resilient lamp engaging portion 17 which is pivoted over and snappingly engages the lamp 12 so as to maintain the lamp in its socket on the carrier body.

The carrier body further includes a storage cavity or non-electric socket 20 for receiving and holding the spare lamp 13. The socket 20 is located in the intermediate portion of the carrier and is provided with a releasable latch or spring clip 21 having a slot 22 with an enlarged portion 23.

The lamp 13 is similar to the lamp 12 in construction. Both lamps are of the standard projection lamp type such as those produced by the Sylvania Company and designated by the name "MINITRU-BEAM." Both lamps include reflectors surrounding the actual lamps so that the lamps are directional. Lamp bodies extend rearwardly of the reflectors. Electrical plug connectors or stabs 24 and 25 extend outwardly of and at right angles to the lamp bodies as shown in the drawings. The stabs are adapted to fit within cooperating connectors or clips (not shown) in socket 14.

When the lamp 13 is placed within the socket 20, it is oriented with respect to the socket such that its electrical connectors 24 and 25 are received by the slot 22. The larger electrical connector 24 is resiliently held within the enlarged portion 23 of the slot. The remaining body portion 26 of the lamp 13 abuts surfaces of the sockets as shown in FIG. 4 and the combination of the contacting surfaces and the resilient holding action of the electrical connector by the clip 21 serves to maintain the spare lamp in a secure position with respect to the lamp carrier body 11.

As best seen in FIG. 4, the stabs of the lamp 13 are disposed at an angle of less than 90° with respect to the longitudinal axis "A" of the lamp carrier in order to maintain overall carrier compactness. Of course, the stabs of lamp 12 extend in the general direction of the longitudinal axis "A" when lamp 12 is in position within its socket (FIG. 4).

The lamp carrier body 11 further includes flanges 30 and a rear end plate 31 which serves to close lamp carrier aperture 60 in the projector body when the carrier is in place. The flanges 30 cooperate with correspondng retaining surfaces in the projector body in order to position the lamp housing in the projector as shown in FIG. 3. These corresponding surfaces include rails 32 and bearing surfaces or rails 33. The bearing surfaces 33 and the rails 32 of the projector are constructed to securely grasp the flanges 30, but also to allow for sliding of the flanges 30 over the respective surfaces so that the lamp carrier can be removed from the projector in the direction of Arrow "B" as shown in FIG. 3. Removal and insertion of the carrier into the projector is thus similar to a drawer-like movement.

For providing electricity to the lamp 12, the lamp carrier body 11 further includes, as shown in FIG. 3, releasable electrical connectors. Electrical stabs 50 are positioned on the lamp carrier to cooperate with electrical connecting clips 51. These clips are connected to a source of electrical power provided to the projector. The stabs 50 are connected to the socket 14 of the lamp carrier by way of conductors 52 and 53 and, as previously described, the lamp 12 is electrically connected to the socket by way of connectors 24 and 25. The carrier thus is electrically connected to the projector as it is moved into final position to engage stabs 50 with clips 51. Removal of the carrier electrically disconnects it from the projector.

While the lamp carrier of the invention may be utilized in a variety of different types of projectors, it is shown in FIG. 3 in use with a portable projector of the type utilizing a film-containing cartridge 40 and enclosing an optical projection path P. A reflecting surface 41 is positioned within the cartridge to divert light from lamp 12, through film 42, and thence through a projection aperture 43. The cartridge is held relatively stationary with respect to the projector surface 45 and the film is intermittently moved past the aperture 43 in a direction normal to the plane of the drawing.

The surface 45 has an aperture 46 to allow the light to be directed along optical path P onto the reflective surface 41 from the lamp 12. The beam of light provided by the lamp 12 is interrupted by a shutter having a plurality of blades 47. These blades are rotated in a plane normal to that of the drawing so as to provide only an intermittent light beam from the lamp 12 to the reflective surface 41. Movement of the shutter and of the film past the aperture 43 is cooperationally timed as is well known in the art. Non-interrupted light from the lamp travels along the projection path P through a film 42 and thereafter through the aperture 43 of the cartridge. The light beam further follows an optical path (not shown) in the projector so as to project an image from the film frame onto a screen positioned at some distance from the projector, or onto a backlit screen which is integral with the projector.

When the lamp 12 burns out, it is a very simple operation to remove the carrier body 11 and replace the burned out lamp 12 with the spare lamp 13. This operation is accomplished by merely grasping the rear end plate 31 of the lamp carrier and pulling it in the direction of Arrow "B" through aperture 60 in the projector.

To facilitate grasping the carrier, a cutout 31c is provided in the rear plate 31. A button 31b removably fills the cutout to prevent the entry of dust and foreign objects. A spring 31s is mounted between a plate 31p and the button to bias the button into the cutout. To remove the carrier, an operator can push the button inwardly with a finger and withdraw the carrier via the cutout. This serves to remove the lamp carrier and disconnects the electrical connection between the projector and the lamp socket.

Resilient clamp 15 can now be pivoted away from the burned-out lamp and it is pulled from its socket as shown in FIG. 2. At this time, the lamp 13 can be pulled from its releasable securing elements in the socket 20 and can then be inserted into the socket 14. The resilient clamp 15 is then snapped over the lamp 13 and the lamp carrier is pushed back into the projector to its home or first position such that the lamp 13 is now operatively positioned with respect to the projector so as to provide a light source for the projection path.

It will be noted that each of the lamps 12 and 13 has a reflector 65 and 66 respectively. While it would be possible to provide the lamp carrier itself with the reflector, it is advantageous in the preferred embodiment to use a lamp having its own reflector such as the lamps illustrated. Lamp 12 of the preferred embodiment is located to project its beam of light in one direction with respect to the lamp carrier, and spare lamp 13 is mounted in the carrier facing in an opposite direction. As can be seen in FIG. 3, this particular mounting provides for the utmost compactness in the structure the lamp carrier.

It will be further noted that when the lamp are to be actually handled, the carrier must be removed from the projector and the lamp energizing circuits are disconnected. This reduces the possibility of shock in replacing a lamp.

While a preferred embodiment of the invention has been described in detail, other alterations and modifications will become readily apparent to one of ordinary skill in the art without departing from the scope of this invention, and the applicants intend to be bound only by the appended claims.

We claim:

1. A projection lamp carrier having a longitudinal body with rear and forward ends and an intermediate portion between said ends,
   an electrical socket at said forward end and a directional primary projection lamp disposed in said socket to direct light in a first direction transverse to said longitudinal body,
   a non-electrical socket in said intermediate portion and a directional secondary lamp disposed in said non-electrical socket directionally opposite to said first direction, and
   electrical connectors disposed on said carrier and connected to said electrical socket for transferring electrical energy to said primary lamp when said carrier is disposed in a first position within a projector so as to position said primary lamp in an optical path thereof and so as to releasably connect said electrical connectors to means providing electrical energy in said projector.

2. A carrier as in claim 1 wherein said carrier is movable between said first position and a second position wherein said carrier is completely withdrawn from said projector and electrically disconnected therefrom.

3. Apparatus as in claim 2 wherein said carrier has a longitudinal axis, wherein each of said lamps includes a lamp body rearwardly of said lamp and electrical stabs for cooperating with said electrical socket, said stabs extending transversely and outwardly from said rearward body, and wherein the stabs of said primary lamp extend into said electrical socket in a direction generally parallel to said longitudinal axis, and the stabs of said secondary lamp are directionally disposed to form an angle of less than 90° with said longitudinal axis.

4. Apparatus as in claim 1 including releasable latch means for holding said secondary lamp in said non-electrical socket.

5. Apparatus as in claim 1 wherein said primary lamp includes a lamp body and further including releasable latch means cooperating with the body to maintain said lamp in said electrical socket.

6. A projection lamp carrier as in claim 1 wherein said carrier is adapted to be inserted into a projector through an aperture in a wall thereof, said projection lamp carrier further including:
   a cover means for providing a closure to said aperture when said carrier is inserted in said projector, said cover means having a cutout providing a means by which the carrier can be withdrawn from the projector, and
   means removably closing said cutout.

7. A projection lamp carrier as in claim 6 wherein said removable closing means including a button filling said cutout and a spring means yieldably urging said button into said cutout.

8. A projection lamp carrier for operably supporting a primary lamp in an optical path of a projector and a secondary lamp in a stored position, said carrier movable between a first position within said projector and a second withdrawn position, comprising:
   a carrier body,
   an electrical socket for operably supporting said primary lamp,
   a non-electrical socket for storing said secondary lamp in a compact position,
   releasable electric connector means for connecting said electrical socket to a source of electrical energy when said carrier is in said first position in said projector, and for disconnecting said electrical socket from said source of electrical energy when said carrier is withdrawn from said projector.

* * * * *